United States Patent
Liu et al.

(10) Patent No.: US 11,381,165 B2
(45) Date of Patent: Jul. 5, 2022

(54) POWER SUPPLY CONTROLLER HAVING REDUCED ACOUSTIC NOISE AND METHOD OF REDUCING ACOUSTIC NOISE

(71) Applicant: Richtek Technology Corporation, Zhubei (TW)

(72) Inventors: Chia-Chi Liu, Kaohsiung (TW); Yu-Chieh Lin, Keelung (TW); Yen-Hsun Wang, Changhua (TW); Ruei-Pei Jiang, Taichung (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 63 days.

(21) Appl. No.: 17/145,464

(22) Filed: Jan. 11, 2021

(65) Prior Publication Data

US 2021/0296985 A1 Sep. 23, 2021

(30) Foreign Application Priority Data

Mar. 17, 2020 (TW) ................................ 109108835

(51) Int. Cl.
*H02M 3/155* (2006.01)
*H02M 1/08* (2006.01)

(52) U.S. Cl.
CPC ............. *H02M 3/155* (2013.01); *H02M 1/08* (2013.01)

(58) Field of Classification Search
CPC ...... H02M 3/155; H02M 1/08; H02M 1/0025; H02M 3/157; H02M 3/158; H02M 3/1582
See application file for complete search history.

(56) References Cited

U.S. PATENT DOCUMENTS 10,277,140 B2 * 4/2019 Jia ........................... H02M 1/14
2009/0059632 A1 3/2009 Li et al.

* cited by examiner

*Primary Examiner* — Kyle J Moody
(74) *Attorney, Agent, or Firm* — Tung & Associates (57) ABSTRACT

The power supply controller is for use in a power supply circuit, for reducing acoustic noise. The power supply control circuit generates a control signal according to a voltage identification (VID) signal and a voltage sense signal, to operate a power switch in a power stage circuit, thus converting an input voltage to an output voltage. The power supply control circuit includes a conversion circuit and a PWM control circuit. The conversion circuit includes a DAC and a slope control circuit. When the power supply controller operates in an acoustic noise reduction mode and when a present level is higher than a requested level, the slope control circuit adjusts a descending slope of an analog voltage identification signal which is generated according to the VID signal, so as to restrain a decrease velocity of the output voltage to be higher than zero but not higher than a predetermined velocity.

12 Claims, 7 Drawing Sheets

POWER SUPPLY CONTROLLER HAVING REDUCED ACOUSTIC NOISE AND METHOD OF REDUCING ACOUSTIC NOISE

CROSS REFERENCE

The present invention claims priority to TW 109108835 filed on Mar. 17, 2020.

BACKGROUND OF THE INVENTION

Field of Invention

The present invention relates to a power supply controller; particularly, it relates to such power supply controller having reduced acoustic noise. The present invention also relates to a method of reducing acoustic noise.

Description of Related Art

Because a multi-layer ceramic capacitor (MLCC) has the merits of low cost and small volume, MLCC is widely used in electronic devices. MLCC is formed by stacking electrode layers and ceramic materials, wherein the ceramic material is a piezoelectric material. When an AC voltage is applied on two ends of a MLCC, the MLCC will be deformed and the deformed MLCC will impact the circuit board nearby the deformed MLCC with a frequency. If this frequency falls within an audible frequency range (between 20 Hz and 20 kHz), it becomes an annoying acoustic noise unpleasant to human ears. Many electronic devices such as notebook computer, tablet computer or smart phone are quite near to human ears when being used. It is important for these electronic devices not to generate acoustic noises to affect a user's comfort, so the issue of acoustic noise should be properly solved.

Generally, a MLCC is coupled to an output voltage. In order to mitigate the acoustic noise, a prior art has proposed such a solution: when the voltage variation frequency (i.e., the frequency of the variation of the output voltage) falls within the audible range, adjust the output voltage to stop the variation of the output voltage, so that the voltage variation frequency drops to zero to thereby avoid the acoustic noise.

The prior art as described above has the following drawbacks that: first, the prior art stops the variation of the output voltage simply by maintaining the output voltage at a constant voltage level. Although this approach avoids the acoustic noise, because it is required for the output voltage to remain at a high voltage level, the power consumption is high. Consequently and undesirably, the battery endurance time of the electronic device is shortened. Second, in the case that the voltage variation frequency is lower than the audible range, although this is supposed not to generate any acoustic noise, if the voltage variation of the output voltage is very fast (i.e., the amplitude of the output voltage varies rapidly), from a perspective of Fourier transformation and frequency expansion, the waveform of the output voltage in fact consists of pulse waves having multiple different frequencies, which may still cause the MLCC to oscillate within the audible range, resulting in generation of the unwanted acoustic noises.

In view of the above, to overcome the drawbacks in the prior art, the present invention proposes a power supply controller having reduced acoustic noise and a method of reducing acoustic noise, which are capable of reducing acoustic noises to prolong the battery endurance time of the electronic device, thus expanding the application of electronic devices.

SUMMARY OF THE INVENTION

From one perspective, the present invention provides a power supply controller for use in a power supply circuit to reduce an acoustic noise of a multi-layer ceramic capacitor (MLCC), wherein the power supply control circuit is configured to operably generate a control signal according to a voltage identification (VID) signal and a voltage sensing signal, to control a power switch in a power stage circuit for converting an input voltage to an output voltage, and wherein the power supply control circuit is configured to operably adjust the output voltage from a present level to a requested level, wherein the MLCC is coupled to the output voltage; the power supply controller comprising: a conversion circuit including: a digital-to-analog converter, which is configured to operably generate an analog voltage identification (AVID) signal according to the VID signal; and a slope control circuit coupled to the digital-to-analog converter, wherein under a situation where the power supply controller operates in an acoustic noise reduction mode and under a situation where the present level is higher than the requested level, the slope control circuit is configured to operably adjust a descending slope of the analog voltage identification signal, so as to generate an adjusted AVID signal, wherein the adjusted AVID signal is configured to operably restrain a decrease velocity of the output voltage to be higher than zero but not higher than a predetermined velocity; and a pulse width modulation (PWM) control circuit coupled to the conversion circuit, wherein the PWM control circuit is configured to operably generate the control signal according to the adjusted AVID signal and the voltage sensing signal.

In one embodiment, the slope control circuit is configured to operably determine whether to enable the acoustic noise reduction mode according to a level difference between the present level and the requested level.

In one embodiment, the slope control circuit is configured to operably determine whether to enable the acoustic noise reduction mode according to a dynamic voltage variation frequency of the analog voltage identification signal.

In one embodiment, the predetermined velocity is not higher than 60 µV/µs.

In one embodiment, the predetermined velocity is adjustable.

In one embodiment, the predetermined velocity is adjusted according to a level difference between the present level and the requested level and/or a dynamic voltage variation frequency of the analog voltage identification signal.

From another perspective, the present invention provides a method of reducing acoustic noise, for use in a power supply circuit to reduce acoustic noise of a multi-layer ceramic capacitor (MLCC), the method of reducing acoustic noise comprising: generating a control signal according to a voltage identification (VID) signal and a voltage sensing signal, so as to control a power switch in a power stage circuit for converting an input voltage to an output voltage, and adjusting the output voltage from a present level to a requested level; generating an analog voltage identification (AVID) signal according to the VID signal through an digital-to-analog conversion; under an acoustic noise reduction mode and under a situation where the present level is higher than the requested level, adjusting a descending slope of the AVID signal, so as to generate an adjusted AVID signal, thereby restraining a decrease velocity of the output voltage to be higher than zero but not higher than a predetermined velocity; and generating the control signal according to the adjusted AVID signal and the voltage sensing signal.

In one embodiment, the method of reducing acoustic noise further comprises: determining whether to enable the acoustic noise reduction mode according to a level difference between the present level and the requested level.

In one embodiment, the method of reducing acoustic noise further comprises: determining whether to enable the acoustic noise reduction mode according to a dynamic voltage variation frequency of the analog voltage identification signal.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
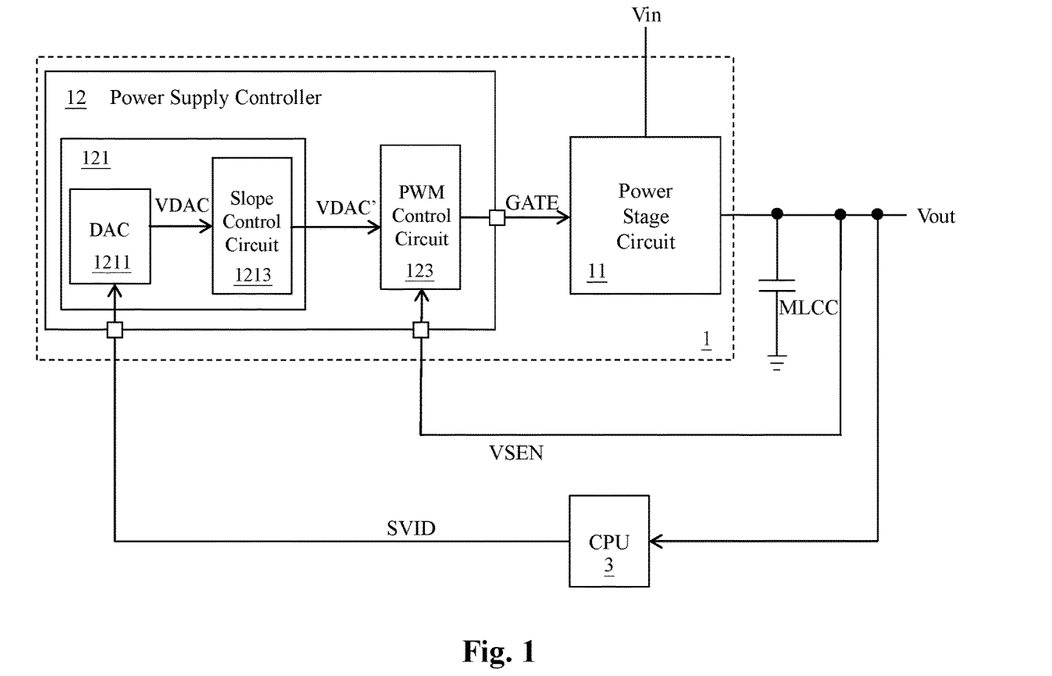
FIG. 1 shows a schematic diagram of a power supply circuit according to an embodiment of the present invention.

Please refer to FIG. 1, which shows a schematic diagram of a power supply circuit (i.e., power supply circuit 12) according to an embodiment of the present invention. The power supply circuit 12 is for use in a power supply circuit 1, to reduce acoustic noises of a multi-layer ceramic capacitor (MLCC). The power supply circuit 1 is configured to operably convert an input voltage Vin to an output voltage Vout. The power supply circuit 1 comprises: a power stage circuit 11 and a power supply controller 12. The power supply controller 12 is configured to operably generate a control signal GATE according to a voltage identification (VID) signal SVID generated by a central processing unit (CPU) 3 and a voltage sensing signal VSEN which is related to the output voltage Vout. The thus generated control signal GATE operably controls a power switch in a power stage circuit 11, so as to convert the input voltage Vin to the output voltage Vout. The voltage identification signal SVID contains various information such as information that requests to change a level of the output voltage Vout, which causes the power supply control circuit 12 to adjust the output voltage Vout from the present level toward the requested level.

The CPU 3 is configured to operably generate the voltage identification signal SVID, to operably request the power supply circuit 1 to dynamically and responsively change the output voltage Vout from the present level toward the requested level, so as to supply power to a load circuit such as the CPU 3 itself.

The power supply controller 12 is for use in the power supply circuit 1, to reduce acoustic noise of a MLCC. The power supply controller 12 comprises: a conversion circuit 121 and a pulse width modulation (PWM) control circuit 123. The conversion circuit 121 includes a digital-to-analog converter (DAC) 1211 and a slope control circuit 1213. The DAC 1211 is configured to operably generate an analog voltage identification signal VDAC according to the voltage identification signal SVID. The voltage identification signal SVID is configured to transmit commands generated from the CPU 3 to the power supply controller 12 via for example a bus, wherein the commands for example comprise clock information, communication information and a dynamic voltage identification request. The power supply controller 12 receives the voltage identification signal SVID via for example a bus control circuit, converts the received voltage identification signal SVID to a digital signal, and transmits the digital signal to the DAC 1211. The DAC 1211 receives the digital signal related to the voltage identification signal SVID and converts the digital signal to the analog voltage identification signal VDAC.

In this embodiment, the slope control circuit 1213 is coupled to the DAC 1211. Under a situation where the power supply controller 12 operates in an acoustic noise reduction mode and when a present level of the output voltage Vout is higher than a requested level defined by the analog voltage identification signal VDAC (i.e., under a situation where the CPU 3 requests the power supply controller 12 to lower down the output voltage Vout from the present level to the requested level), the slope control circuit 1213 operably adjusts a descending slope of the analog voltage identification signal VDAC to generate an adjusted analog voltage identification signal VDAC', so as to restrain a decrease velocity of the output voltage Vout to be higher than zero but not higher than a predetermined velocity.

The PWM control circuit 123 is configured to operably generate the control signal GATE according to the adjusted analog voltage identification signal VDAC' and the voltage sensing signal VSEN, for controlling a power switch in the power stage circuit 11 to convert the input voltage Vin to the output voltage Vout. The voltage sensing signal VSEN is a signal which is related to the output voltage Vout and is fed back to the PWM control circuit 123. According to the present invention, the power stage circuit 11 can be implemented as, for example but not limited to, a synchronous or asynchronous buck, boost, inverting, buck-boost or inverting-boost power stage circuit, as shown in FIGS. 7A-7J.

In this embodiment, the power supply controller 12 is capable of reducing acoustic noise, in particular the acoustic noises generated by a MLCC. The MLCC is coupled between the output voltage Vout and a ground level.

Figure 2A:
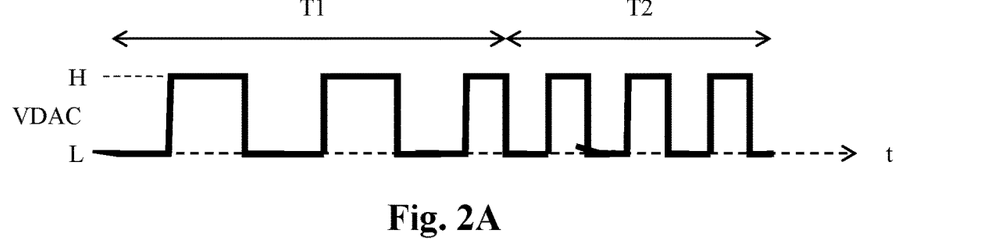
FIGS. 2A-2C illustrate waveforms during the operation of a power supply circuit according to an embodiment of the present invention.
Figure 2B:
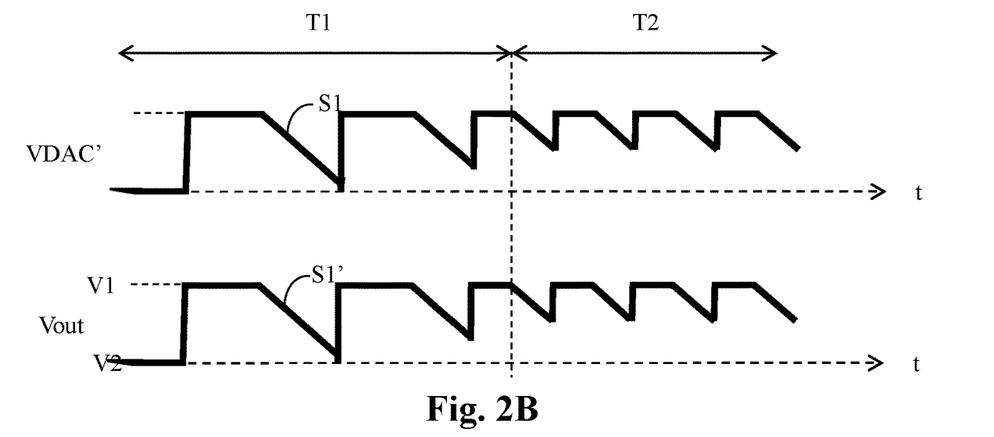
Figure 2C:
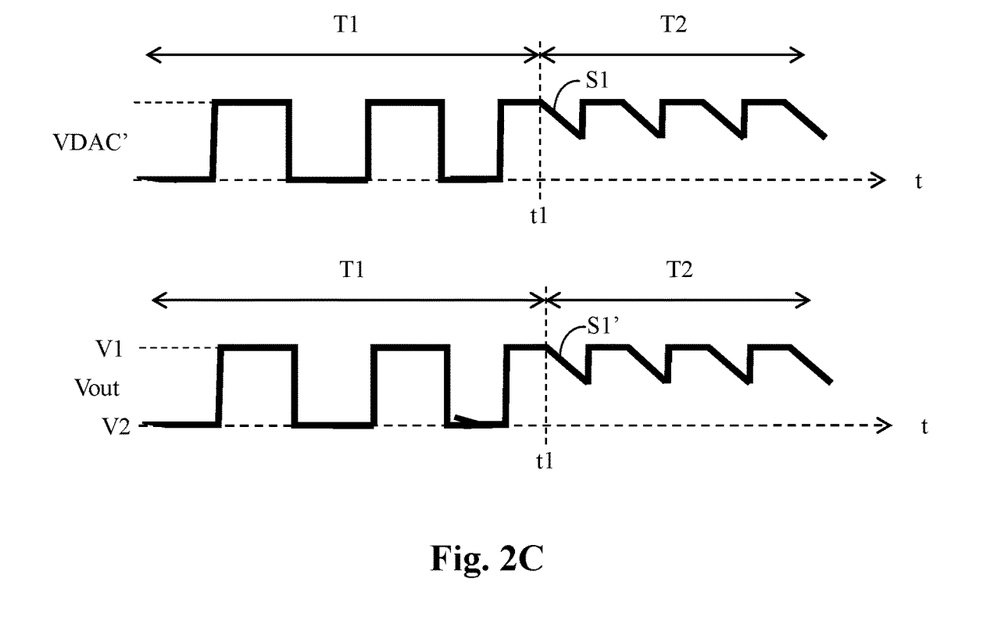

Please refer to FIGS. 2A-2C, which illustrate waveforms during the operation of a power supply circuit according to an embodiment of the present invention. For example, the analog voltage identification signal VDAC is as shown by the waveform diagram in FIG. 2A, in which the horizontal axis denotes time (t). When the analog voltage identification signal VDAC switches to high level H, it means that the analog voltage identification signal VDAC requests the power supply circuit 1 to regulate the output voltage Vout to a level V1 as shown in FIG. 2B. On the other hand, when the analog voltage identification signal VDAC switches to low level L, it means that the analog voltage identification signal VDAC requests the power supply circuit 1 to regulate the output voltage Vout to a level V2 as shown in FIG. 2B. However, the requested level dynamically changes depending upon the demand of the CPU 3, and the change does not have a regular pattern, that is, the analog voltage identification signal VDAC does not have a constant frequency. Therefore, the power supply controller 12 is unable to know in advance about the frequency of the analog voltage identification signal VDAC before the power supply controller 12 receives the analog voltage identification signal VDAC, since the frequency of the analog voltage identification signal VDAC is not a regular pattern. For example, as shown in FIG. 2A, during the duration T1, the analog voltage identification signal VDAC has a lower frequency, whereas, during the duration T2, the analog voltage identification signal VDAC has a higher frequency.

In one embodiment, as shown in FIG. 2B, when the analog voltage identification signal VDAC switches from high level H to low level L, which indicates a request to change the output voltage Vout from the present level (e.g. the level V1 in the waveform of the output voltage Vout illustrated in FIG. 2B) to the requested level (e.g. the level V2 in the waveform of the output voltage Vout illustrated in FIG. 2B) which is lower than the present level, the power supply controller 12 will enable an acoustic noise reduction mode. In this acoustic noise reduction mode, the power supply controller 12 restrains a descending slope of the adjusted analog voltage identification signal VDAC' to be a slope S1, so that a decrease velocity S1' of the output voltage Vout is restrained to be higher than zero but not higher than a predetermined velocity, to control the output voltage Vout to decrease gradually toward the requested level V2. In one embodiment, it is not required to ensure the output voltage Vout to reach the level V2 before the analog voltage identification signal VDAC switches from low level L to high level H; the output voltage Vout is kept gradually decreasing toward the requested level (i.e., to reach whatever level it is at the time point when the analog voltage identification signal VDAC switches from low level L to high level H, and to reach at most the requested level).

Generally, when the analog voltage identification signal VDAC requests the output voltage Vout to change from a present lower level (e.g. as shown by the level V2 in FIG. 2B) to a higher requested level (e.g. as shown by the level V1 in FIG. 2B), the power supply controller 12 should elevate up the output voltage Vout to the requested level quickly; this is because a higher requested level indicates a requirement of higher power consumption by the load circuit (e.g. the CPU 3 in FIG. 1) which receives power from the output voltage Vout, so the output voltage Vout should be elevated up to the requested level by a fast increase velocity and the increase velocity should not be slowed down. On the other hand, when the analog voltage identification signal VDAC requests the output voltage Vout to change from a present higher level (e.g. as shown by the level V1 in FIG. 2B) to a lower requested level (e.g. as shown by the level V2 in FIG. 2B), it generally indicates that the load circuit (e.g. the CPU 3 in FIG. 1) which receives power from the output voltage Vout does not have a requirement of high power consumption, and the objective to decrease the output voltage Vout is for power saving. Accordingly, the present invention can lower the decrease velocity S1' of the output voltage Vout to reduce acoustic noise while still attaining the objective of reducing the power consumption, to prolong the battery endurance time.

It is noteworthy that, in one embodiment, under a situation where the analog voltage identification signal VDAC requests the output voltage Vout to change from a lower present level to a higher requested level while the load circuit which receives power from the output voltage Vout does not have the requirement of quickly elevating up the voltage, it is also practicable for the present invention to cause the output voltage Vout to be gradually elevated up from the lower present level to the higher requested level by a low increase velocity, as long as the acoustic noise falls within an acceptable range. That is, under such situation, it is also practicable and within the scope of the present invention that the increase velocity can be reduced.

To restrain the descending slope of the adjusted analog voltage identification signal VDAC' to be the slope S1, so that the decrease velocity S1' of the output voltage Vout is restrained to be higher than zero but not higher than a predetermined velocity, whereby the level of the output voltage Vout decreases toward the requested level, a preferred number of the slope S1 can be determined according to the range of the acoustic noise which is bearable to human ear. Besides, the slope S1 also can be determined according to a government regulation or required product specification about acoustic noise.

In one embodiment, as shown in FIG. 2C, the power supply controller 12 can enable the acoustic noise reduction mode according to a dynamic voltage variation frequency of the analog voltage identification signal (i.e. the frequency of voltage changes of the analog voltage identification signal, also referred to simply as "the frequency of the analog voltage identification signal" in the context of the present invention). Please refer to FIG. 2C along with FIG. 2A, for example, during the duration T1, because the frequency of the analog voltage identification signal VDAC is relatively low (e.g., this frequency falls outside the audible range), the power supply controller 12 does not enable the acoustic noise reduction mode. On the other hand, during the duration T2 which follows after a time point t1, because the frequency of the analog voltage identification signal VDAC is relatively high (e.g., this frequency falls within the audible range), the power supply controller 12 will enable the acoustic noise reduction mode. Under the acoustic noise reduction mode, the power supply controller 12 can restrain a descending slope of the adjusted analog voltage identification signal VDAC' to be a slope S1, so that a decrease velocity S1' of the output voltage Vout is restrained to be higher than zero but not higher than a predetermined velocity, thereby gradually adjusting the output voltage Vout from the present level V1 toward the requested level V2. It is noteworthy that, in one embodiment, it is not required to ensure the output voltage Vout to reach the level V2 before the analog voltage identification signal VDAC switches from low level L to high level H; the output voltage Vout is kept gradually decreasing toward the requested level (i.e., to reach whatever level it is at the time point when the analog voltage identification signal VDAC switches from low level L to high level H, and to reach at most the requested level).

Figure 3A:
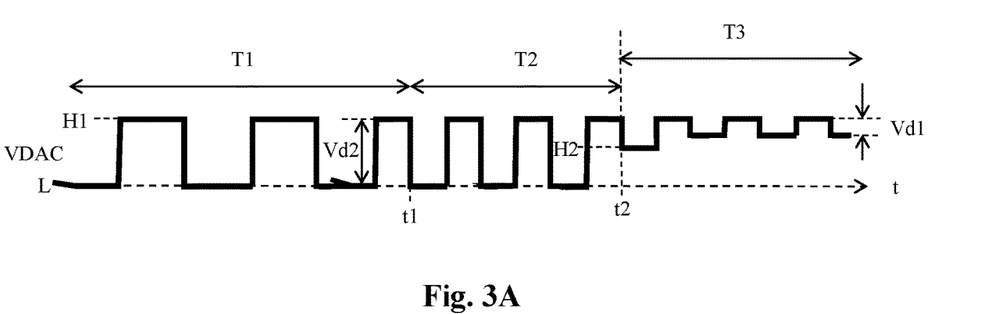
FIGS. 3A-3B illustrate waveforms during the operation of a power supply circuit according to another embodiment of the present invention.
Figure 3B:
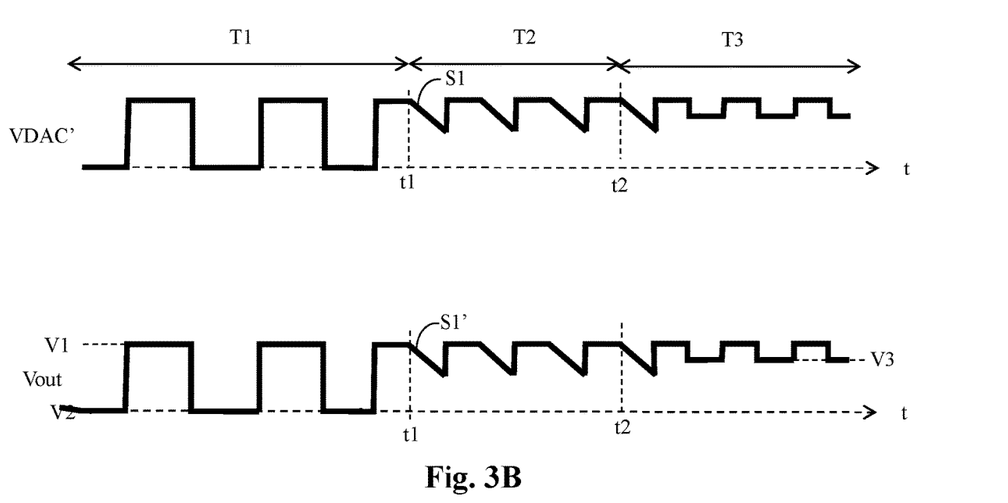

Please refer to FIGS. 3A-3B, which illustrate waveforms during the operation of a power supply circuit according to another embodiment of the present invention. For example, an analog voltage identification signal VDAC is as shown by the waveform diagram in FIG. 3A, in which the horizontal axis denotes time (t). When the analog voltage identification signal VDAC switches to high level H1, it means that the analog voltage identification signal VDAC requests the power supply circuit 1 to regulate the output voltage Vout to the level V1 as shown in FIG. 3B. On the other hand, when the analog voltage identification signal VDAC switches to low level L, it means that the analog voltage identification signal VDAC requests the power supply circuit 1 to regulate the output voltage Vout to the level V2 as shown in FIG. 3B. Moreover, when the analog voltage identification signal VDAC switches to another high level H2 (referring to FIG. 3A along with FIG. 3B), the analog voltage identification signal VDAC requests the power supply circuit 1 to regulate the output voltage Vout to the level V3 as shown in FIG. 3B.

The embodiment of FIGS. 3A-3B is different from the embodiment of FIG. 2C in that: in the embodiment of FIGS. 3A-3B, when the analog voltage identification signal VDAC switches from high level H1 to another high level H2 (i.e., during the duration T3 which follows the time point t2), it indicates that the analog voltage identification signal VDAC requests to change the output voltage Vout from the present level (e.g. the level V1 in the waveform of the output voltage Vout illustrated in FIG. 3B) to a relatively lower requested level (e.g. the level V3 in the waveform of the output voltage Vout illustrated in FIG. 3B). In this embodiment of FIGS. 3A-3B, the power supply controller 12 can determine whether to enable the acoustic noise reduction mode according to a level difference Vd1 between the present level and the requested level. In one embodiment, when the level difference Vd1 is not greater than a level difference threshold, the power supply controller 12 will determine not to enable the acoustic noise reduction mode. That is, under such circumstance, the power supply controller 12 will not restrain a decrease velocity of the output voltage Vout. The reason for such mechanism is that: when a level difference Vd1 between the present level and the requested level is not greater than a level difference threshold, the acoustic noise is not perceivable by human ear, which is acceptable. In one embodiment, the level difference threshold can be adjusted depending upon practical needs.

On the other hand, when the analog voltage identification signal VDAC switches from high level H1 to low level L (i.e., during the duration T2 which follows the time point t1), it indicates that the analog voltage identification signal VDAC requests to change the output voltage Vout from the present level (e.g. the level V1 in the waveform of the output voltage Vout illustrated in FIG. 3B) to another relatively lower requested level (e.g. the level V2 in the waveform of the output voltage Vout illustrated in FIG. 3B). In this embodiment of FIGS. 3A-3B, because the level difference Vd2 between the present level and the requested level is greater than a level difference threshold, the power supply controller 12 determines to enable the acoustic noise reduction mode. Consequently, under such circumstance, the power supply controller 12 can restrain a descending slope of the adjusted analog voltage identification signal VDAC' to be a slope S1, so that a decrease velocity S1' of the output voltage Vout is restrained to be higher than zero but not higher than a predetermined velocity, thereby gradually adjusting the output voltage Vout from the level V1 to the requested level V2. Certainly, it is also practicable and within the scope of the present invention that the power supply controller 12 can determine whether to enable the acoustic noise reduction mode according to a frequency of the analog voltage identification signal VDAC. For example, during the duration T1, because the frequency of the analog voltage identification signal VDAC is low (e.g., this frequency falls outside the audible range), the power supply controller 12 does not enable the acoustic noise reduction mode. In other words, in one embodiment, the slope control circuit 1213 can determine whether to enable the acoustic noise reduction mode according to a level difference between the present level and the requested level, while in another embodiment, the slope control circuit 1213 can determine whether to enable the acoustic noise reduction mode according to a dynamic voltage variation frequency of the analog voltage identification signal VDAC. It should be understood that the two mechanisms described above can be used in combination, or each of the two mechanisms can be used alone, both of which are within the scope of the present invention.

Figure 4A:
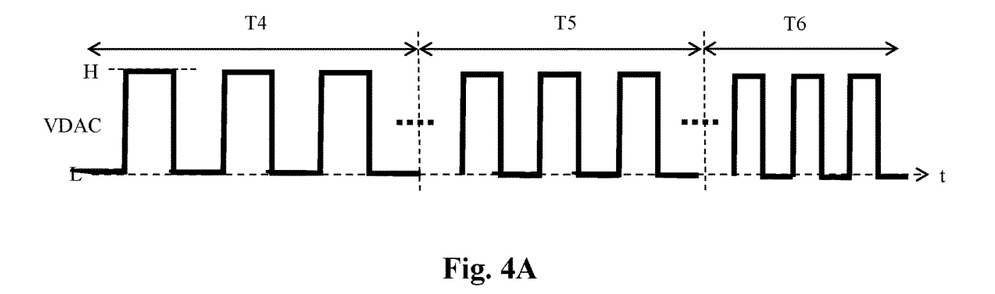
FIGS. 4A-4B illustrate waveforms during the operation of a power supply circuit according to yet another embodiment of the present invention.
Figure 4B:
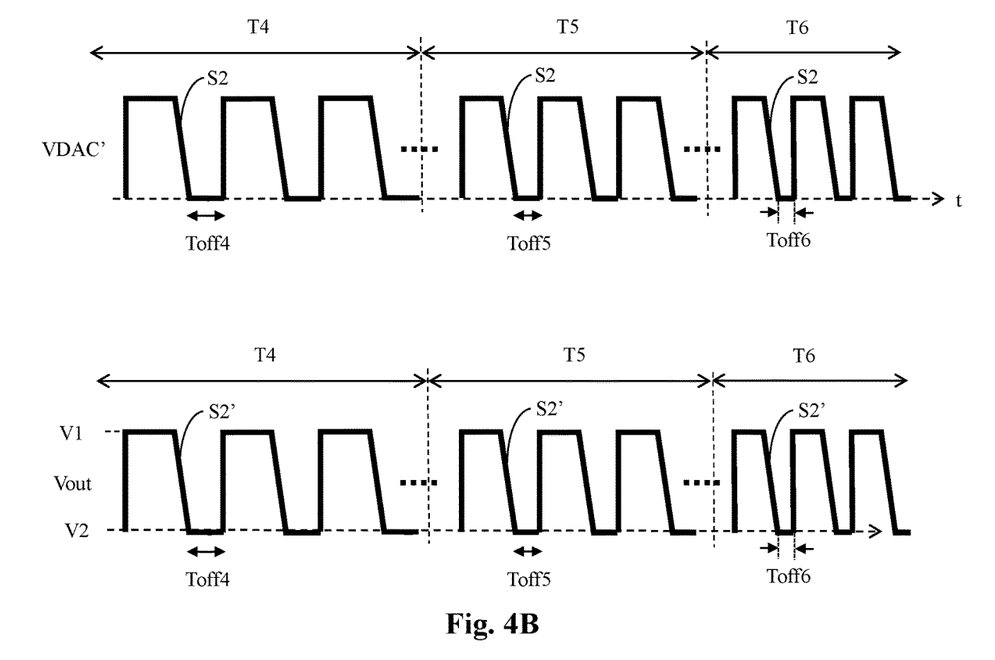

Please refer to FIGS. 4A-4B, which illustrate waveforms during the operation of a power supply circuit according to yet another embodiment of the present invention. For example, an analog voltage identification signal VDAC is as shown by the waveform diagram in FIG. 4A. In the waveform diagram of the analog voltage identification signal VDAC, in which the horizontal axis denotes time (t). When the analog voltage identification signal VDAC switches to high level H, it means that the analog voltage identification signal VDAC requests the power supply circuit 1 to regulate the output voltage Vout to the level V1 as shown in FIG. 4B. On the other hand, when the analog voltage identification signal VDAC switches to low level L, it means that the analog voltage identification signal VDAC requests the power supply circuit 1 to regulate the output voltage Vout to the level V2 as shown in FIG. 4B.

In the embodiments of FIGS. 4A-4B, the duration T4, the duration T5 and the duration T6 show that the analog voltage identification signal VDAC have three different frequencies. The analog voltage identification signal VDAC has a lowest frequency during the duration T4, whereas, the analog voltage identification signal VDAC has a highest frequency during the duration T6. As shown in FIGS. 4A-4B, during the duration T4, the duration T5 and the duration T6, the power supply controller 12 operates in an acoustic noise reduction mode. That is, the power supply controller 12 restrains a descending slope of the adjusted analog voltage identification signal VDAC' to be a slope S2, so that a decrease velocity S2' of the output voltage Vout is restrained to be higher than zero but not higher than a predetermined velocity, thereby gradually adjusting the output voltage Vout from the level V1 to the requested level V2.

The embodiment of FIGS. 4A-4B illustrates that: according to the present invention, under the acoustic noise reduction mode, when the analog voltage identification signal VDAC has a higher dynamic voltage variation frequency, the time that the output voltage Vout remains at the low voltage level V2 is shorter, and when the analog voltage identification signal VDAC has a lower dynamic voltage variation frequency, the time that the output voltage Vout remains at the low voltage level V2 is longer. Referring to the waveforms in the durations T4, T5 and T6 in FIG. 4A and FIG. 4B, wherein the adjusted analog voltage identification signal VDAC' has three different frequencies in the three durations, it can be clearly seen that: during the duration T4 wherein the adjusted analog voltage identification signal VDAC' has a lowest frequency, the output voltage Vout remains at the low level V2 for a longest duration Toff4; during the duration T5 wherein the adjusted analog voltage identification signal VDAC' has a medium frequency, the output voltage Vout remains at the low level V2 for a medium duration Toff5; during the duration T6 wherein the adjusted analog voltage identification signal VDAC' has a highest frequency, the output voltage Vout remains at the low level V2 for a shortest duration Toff6. The embodiment of FIGS. 4A-4B demonstrates that: the present invention can dynamically and adaptively adjust the descending slope S2 of the adjusted analog voltage identification signal VDAC' so that the decrease velocity S2' of the output voltage Vout is proper and not higher than a predetermined velocity. As a result, the acoustic noise generated by the MLCC can be reduced to an acceptable range. Furthermore, through such mechanism, the output voltage Vout is controlled to remain at a relatively low level, which can prolong the battery endurance time of an electronic device, and expand the application of the electronic device.

In one embodiment, the decrease velocity S2' is not higher than a predetermined velocity which is 60 µV/µs. In one embodiment, the decrease velocity S2' is not higher than a predetermined velocity which is 30 µV/µs. In one preferred embodiment, the decrease velocity S2' is not higher than a predetermined velocity which is 12 µV/µs. In one preferred embodiment, the decrease velocity S2' is set to 6 µV/µs. In one embodiment, the predetermined velocity is adjustable; under such circumstance, the predetermined velocity can be adjusted for example depending upon the application of the electronic device and the specification of the electronic device itself. In one embodiment, the predetermined velocity can be adjusted according to a level difference between the present level and the requested level and/or the dynamic voltage variation frequency of the analog voltage identification signal VDAC. For example, in one embodiment, as shown by the waveform of the output voltage Vout illustrated in FIG. 4B, the present invention can restrain the decrease velocity S2' of the output voltage Vout not to be higher than 60 µV/µs, whereby when the acoustic noise falls within a most unwanted frequency range (e.g., within a range from 1 kHz to 3 kHz) and the output voltage Vout is requested be reduced from the present level V1, the reduced level (the difference between V1 and the adjusted level) does not exceed 60 mV, to comply with the regulation of noise.

Figure 5:
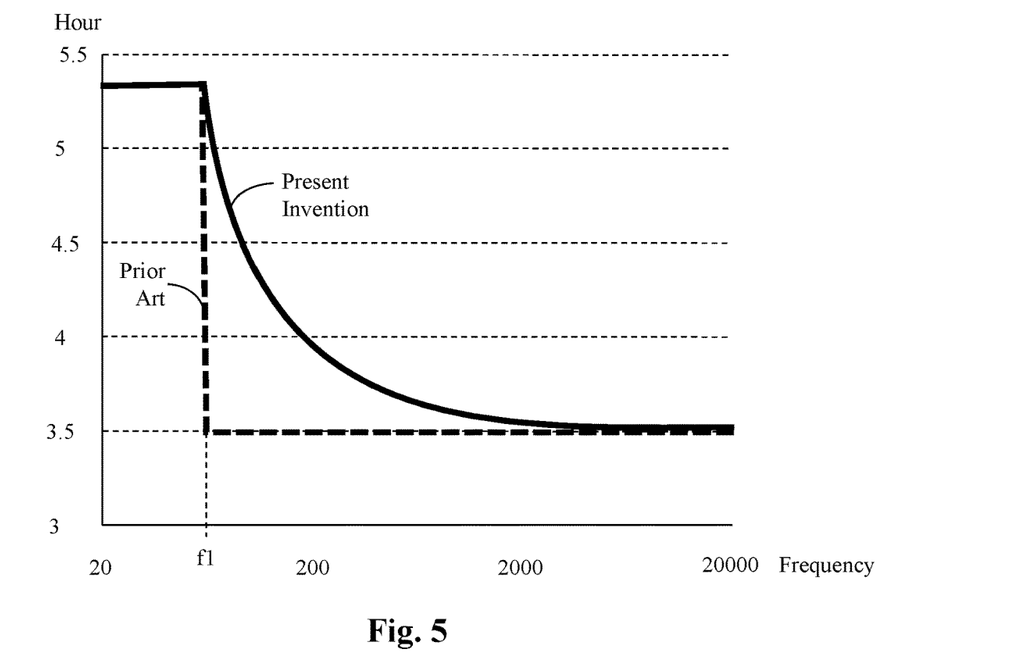
FIG. 5 shows a comparison between a battery endurance time of the present invention and a battery endurance time of the prior art.

Please refer to FIG. 5, which shows a comparison between a battery endurance time of the present invention and a battery endurance time of the prior art. In FIG. 5, the thick dashed line shows the relationship between battery endurance time and frequency in prior art. This prior art stops changing the output voltage and maintains the output voltage at a constant voltage level when the dynamic voltage variation frequency exceeds the frequency f1; although this approach avoids the generation of the acoustic noise, because the output voltage constantly remains at a high voltage level, the power consumption is great and the battery endurance time is short, which limits the application of an electronic device. On the other hand, the thick solid line in FIG. 5 shows the relationship between battery endurance time and frequency in the present invention. Because the present invention can adjust the output voltage in a gradually decreasing manner, even though under a circumstance where the dynamic voltage variation frequency is low, the present invention is still capable of adjusting the output voltage to a relatively lower voltage level, to reduce power consumption. Consequently and desirably, the present invention can prolong the battery endurance time, while reducing the acoustic noise.

Figure 6:
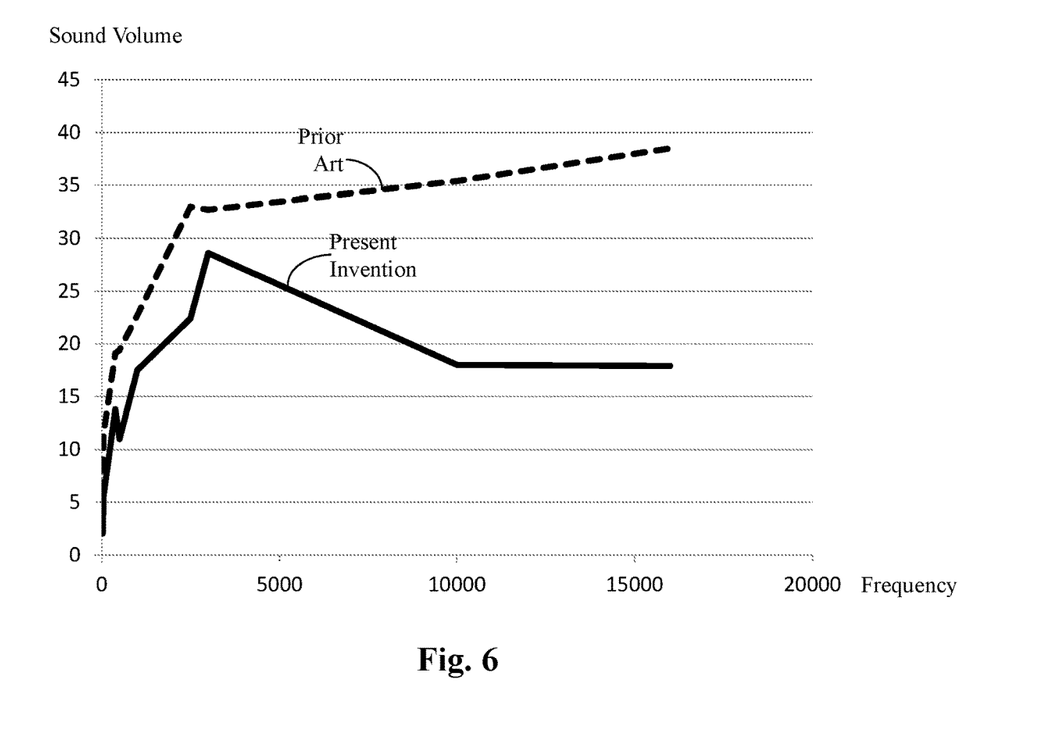
FIG. 6 shows a comparison between a sound volume of the present invention and a sound volume of the prior art.
Figure 7A:
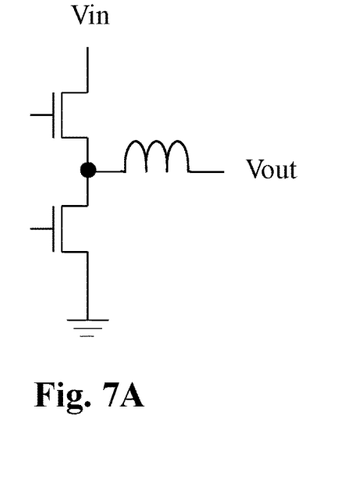
FIGS. 7A-7J show synchronous and asynchronous buck, boost, inverting, buck-boost and inverting-boost power stage circuits, respectively.
Figure 7B:
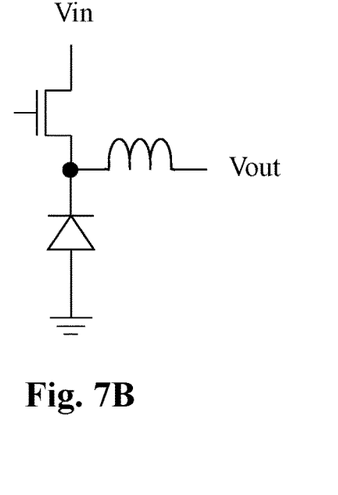
Figure 7C:
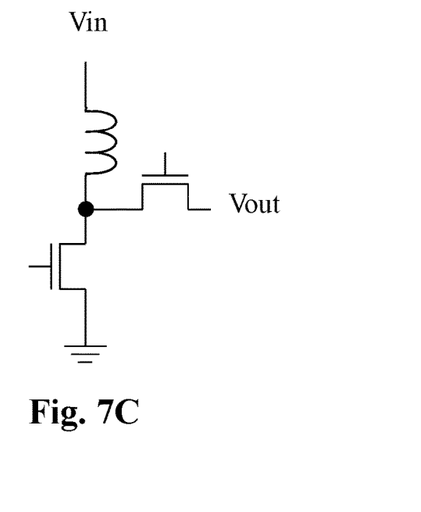
Figure 7D:
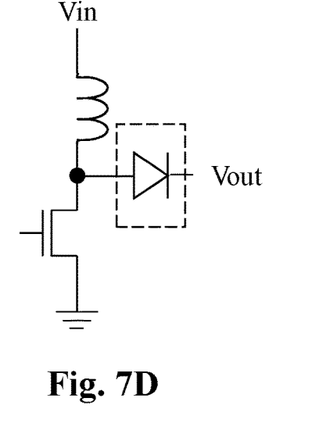
Figure 7E:
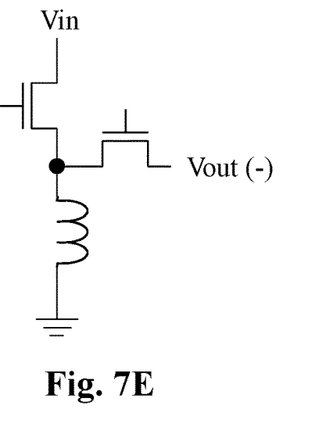
Figure 7F:
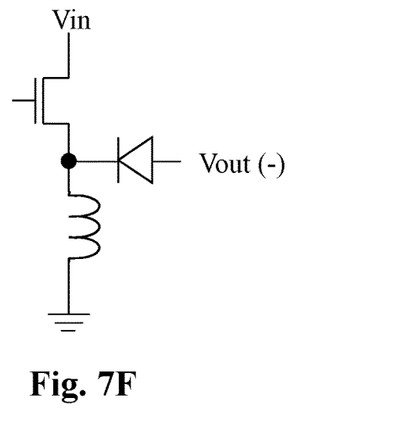
Figure 7G:
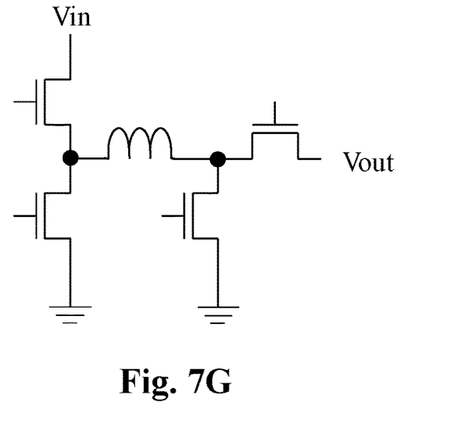
Figure 7H:
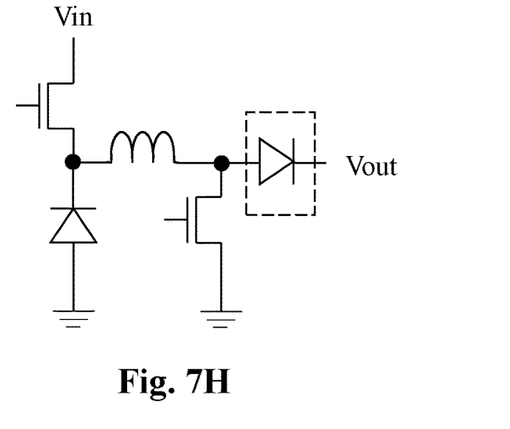
Figure 7I:
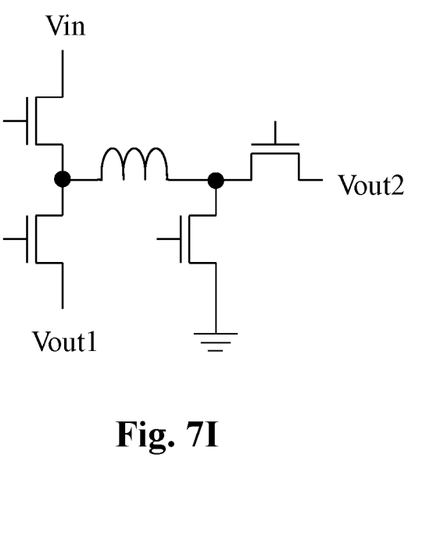
Figure 7J:
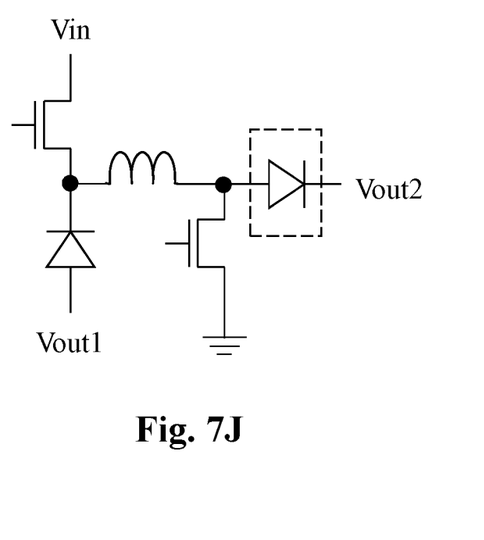

Please refer to FIG. 6, which shows a comparison between a sound volume of the present invention and a sound volume of the prior art. In FIG. 6, the thick dashed line shows the relationship between sound volume and frequency in prior art. On the other hand, in FIG. 6, the thick solid line shows the relationship between sound volume and frequency in the present invention. As shown in FIG. 6, the power supply controller and the method of reducing acoustic noise according to the present invention can remarkably reduce the acoustic noise under different dynamic voltage variation frequencies, which demonstrates that the present invention is superior over the prior art.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply controller for use in a power supply circuit to reduce an acoustic noise of a multi-layer ceramic capacitor (MLCC), wherein the power supply control circuit is configured to operably generate a control signal according to a voltage identification (VID) signal and a voltage sensing signal, to control a power switch in a power stage circuit for converting an input voltage to an output voltage, and wherein the power supply control circuit is configured to operably adjust the output voltage from a present level to a requested level, wherein the MLCC is coupled to the output voltage; the power supply controller comprising:
   a conversion circuit including:
      a digital-to-analog converter, which is configured to operably generate an analog voltage identification (AVID) signal according to the VID signal; and
      a slope control circuit coupled to the digital-to-analog converter, wherein under a situation where the power supply controller operates in an acoustic noise reduction mode and under a situation where the present level is higher than the requested level, the slope control circuit is configured to operably adjust a descending slope of the analog voltage identification signal, so as to generate an adjusted AVID signal, wherein the adjusted AVID signal is configured to operably restrain a decrease velocity of the output voltage to be higher than zero but not higher than a predetermined velocity; and
   a pulse width modulation (PWM) control circuit coupled to the conversion circuit, wherein the PWM control circuit is configured to operably generate the control signal according to the adjusted AVID signal and the voltage sensing signal.

2. The power supply controller of claim 1, wherein the slope control circuit is configured to operably determine whether to enable the acoustic noise reduction mode according to a level difference between the present level and the requested level.

3. The power supply controller of claim 1, wherein the slope control circuit is configured to operably determine whether to enable the acoustic noise reduction mode according to a dynamic voltage variation frequency of the AVID signal.

4. The power supply controller of claim 1, wherein the predetermined velocity is not higher than 60 µV/µs.

5. The power supply controller of claim 1, wherein the predetermined velocity is adjustable.

6. The power supply controller of claim 5, wherein the predetermined velocity is adjusted according to a level difference between the present level and the requested level and/or a dynamic voltage variation frequency of the AVID signal.

7. A method of reducing acoustic noise, for use in a power supply circuit to reduce acoustic noise of a multi-layer ceramic capacitor (MLCC), the method of reducing acoustic noise comprising:
 generating a control signal according to a voltage identification (VID) signal and a voltage sensing signal, so as to control a power switch in a power stage circuit for converting an input voltage to an output voltage, and adjusting the output voltage from a present level to a requested level;
 generating an analog voltage identification (AVID) signal according to the VID signal through an digital-to-analog conversion;
 under an acoustic noise reduction mode and under a situation where the present level is higher than the requested level, adjusting a descending slope of the AVID signal, so as to generate an adjusted AVID signal, thereby restraining a decrease velocity of the output voltage to be higher than zero but not higher than a predetermined velocity; and
 generating the control signal according to the adjusted AVID signal and the voltage sensing signal.

8. The method of reducing acoustic noise of claim 7, further comprising:
 determining whether to enable the acoustic noise reduction mode according to a level difference between the present level and the requested level.

9. The method of reducing acoustic noise of claim 7, further comprising:
 determining whether to enable the acoustic noise reduction mode according to a dynamic voltage variation frequency of the AVID signal.

10. The method of reducing acoustic noise of claim 7, wherein the predetermined velocity is not higher than 60 µV/µs.

11. The method of reducing acoustic noise of claim 7, wherein the predetermined velocity is adjustable.

12. The method of reducing acoustic noise of claim 11, wherein the predetermined velocity is adjusted according to a level difference between the present level and the requested level and/or a dynamic voltage variation frequency of the AVID signal.

* * * * *